United States Patent
Yang et al.

(10) Patent No.: US 6,922,210 B2
(45) Date of Patent: Jul. 26, 2005

(54) MEMORY UPDATING FOR DIGITAL PIXEL SENSORS

(75) Inventors: David Xiao Dong Yang, Mountain View, CA (US); Zhonghan Deng, Albany, CA (US)

(73) Assignee: Pixim, Inc., Mountain View, CA (US)

( * ) Notice: Subject to any disclaimer, the term of this patent is extended or adjusted under 35 U.S.C. 154(b) by 863 days.

(21) Appl. No.: 09/801,014

(22) Filed: Mar. 6, 2001

(65) Prior Publication Data

US 2001/0009440 A1 Jul. 26, 2001

Related U.S. Application Data (63) Continuation-in-part of application No. 09/567,786, filed on May 9, 2000, and a continuation-in-part of application No. 09/567,638, filed on May 9, 2000, now abandoned, and a continuation-in-part of application No. 09/365,054, filed on Jul. 30, 1999, now abandoned.

(51) Int. Cl.$^7$ .......................... H04N 5/335; H04N 5/235
(52) U.S. Cl. ........................ 348/308; 348/302; 348/362
(58) Field of Search ................................ 348/302, 308, 348/362, 367, 294, 297, 241, 298; 250/208.1, 214, 201.4

(56) References Cited

U.S. PATENT DOCUMENTS

| | | | | |
|---|---|---|---|---|
| 4,541,075 A | * | 9/1985 | Dill et al. | 365/189.04 |
| 5,309,243 A | * | 5/1994 | Tsai | 348/221.1 |
| 5,872,596 A | * | 2/1999 | Yanai et al. | 348/297 |
| 5,909,026 A | * | 6/1999 | Zhou et al. | 250/208.1 |
| 6,229,133 B1 | * | 5/2001 | Hynecek | 250/208.1 |
| 6,330,030 B1 | * | 12/2001 | O'Connor | 348/297 |
| 6,614,560 B1 | * | 9/2003 | Silverbrook | 358/443 |

FOREIGN PATENT DOCUMENTS

| | | | | |
|---|---|---|---|---|
| JP | 04313949 A | * | 11/1992 | H04N/1/04 |

* cited by examiner

*Primary Examiner*—Thai Tran
*Assistant Examiner*—Lin Ye
(74) *Attorney, Agent, or Firm*—Patent Law Group LLP; Carmen C. Cook (57) ABSTRACT

An improved technique for updating a memory in digital pixel sensors in which a memory update may be directed to only some of the locations or cells in the memory is disclosed. According to one embodiment, a multiplex scheme is employed, in which a threshold memory identifies the locations within a row of memory that are to be updated. Data are first read out of a row of memory to be updated. The data are copied to a first buffer or other short term storage area within the digital pixel sensor. New data from the sensor portion of the digital pixel sensor to be written to the memory are stored in a second buffer. The contents of the threshold memory are then applied to a select input of a multiplexer, where the contents of the first and second buffers comprise first and second data inputs to the multiplexer. Thus, the output of the multiplexer comprises an updated row of memory in which only those locations that are to be updated have been changed. The output of the multiplexer is preferably written directly back to the memory and a next row of memory may then be updated.

23 Claims, 5 Drawing Sheets

MEMORY UPDATING FOR DIGITAL PIXEL SENSORS

CROSS-REFERENCE TO RELATED APPLICATIONS

This application is related to U.S. Pat. Nos. 5,461,425 and 5,801,657 and pending U.S. patent application Ser. No. 09/274,202, filed on Mar. 22, 1999. This application is a continuation-in-part of patent application Ser. No. 09/567,786 (filed 9 May 2000), Ser. No. 09/567,638 (filed 9 May 2000), now abandoned, and Ser. No. 09/365,054, filed Jul. 30, 1999, now abandoned.

BACKGROUND OF THE INVENTION

1. Technical Field

The invention relates to image sensor systems. More particularly, the invention relates to an image sensor architecture and associated method for facilitating image multiple sampling using a time-indexed approach to achieve a wide dynamic range.

2. Description of Related Art

Digital photography is one of the most exciting technologies to have emerged during the twentieth century. With the appropriate hardware and software (and a little knowledge), anyone can put the principles of digital photography to work. Digital cameras, for example, are on the cutting edge of digital photography. Recent product introductions, technological advancements, and price cuts, along with the emergence of email and the World Wide Web, have helped make the digital cameras one of the hottest new category of consumer electronics products.

Digital cameras, however, do not work in the same way as traditional film cameras do. In fact, they are more closely related to computer scanners, copiers, or fax machines. Most digital cameras use an image sensor or photosensitive device, such as charged-coupled device (CCD) or complementary metal-oxide semiconductor (CMOS) to sense a scene. The photosensitive device reacts to light reflected from the scene and can translate the strength of that reaction into a numeric equivalent. By passing light through red, green, and blue filters, for example, the reaction can be gauged for each separate color spectrum. When the readings are combined and evaluated via software, the camera can determine the specific color of each element of the picture. Because the image is actually a collection of numeric data, it can easily be downloaded into a computer and manipulated for more artistic effects.

Nevertheless, there are many cases in which digital cameras simply can not be used because of the limited resolution of the image sensors in today's digital cameras. Film-based photographs have immeasurably higher resolution than digital cameras. While traditional film-based technology typically has a resolution of tens millions of pixels, the image sensors in the digital cameras that could be produced at a price that is acceptable to consumers is slightly more than a few millions of pixels today.

Dynamic range is another critical figure of merit for image sensors used in digital cameras. The dynamic range of an image sensor is often not wide enough to capture scenes with both highlights and dark shadows. This is especially the case for CMOS sensors which, in general, have lower dynamic range than CCDs.

Previously suggested solutions for widening the dynamic range of these devices can be divided into three categories:

Compressing the response curve;

Multiple sampling; and

Control over integration time.

The response curve is compressed by using a sensor that has a logarithmic response. There are two ways of doing this:

The first approach is to use a CMOS sensor that operates in an instantaneous current read out mode. In this mode, the photocurrent generated by a photodetector is fed into a device that has a logarithmic response, for example a diode connected MOS transistor, to compress the sensor transfer curve. Although this scheme can achieve very wide dynamic range, the resulting image quality is generally poor due to a low signal-to-noise ratio (SNR).

The second approach to compress the response curve uses a technique referred to as well capacity adjusting. Here, the dynamic range is enhanced by increasing well capacity one or more times during exposure time. During integration well capacity is monotonically increased to its maximum value. The excess photo-generated charge is drained via an overflow gate. This scheme, however, suffers from large fixed pattern noise and degradation in the SNR.

Controlling integration time is another method that has some promising aspects in comparison with others. In essence, the exposure time of each pixel is individually adjusted so that they do not get saturated at the end of each integration period. There are many ways of achieving this. One way is to place a set-reset flip-flop and an AND gate at each pixel to control the integration start time to achieve local exposure control. However, this approach suffers the following limitations:

Each pixel is large due to the inclusion of the flip-flop and the AND gate.

A large 'timestamp' memory is needed to store the exposure time of all pixels. The exposure time of each pixel can be determined by trying out various exposure times. When capturing a moving scene, the exposure times change so the 'timestamp' memory must be updated, which not only is burdensome but also causes image lag.

Moreover, in addition to the column and row decoders used for pixel read out, another column and row decoders are needed to control the flip-flops.

A second way is known for an individual pixel reset (IPR) to achieve local exposure control, namely a second reset transistor is added to the standard three-transistor APS design so that the integration start time of each pixel can be controlled externally. The second way keeps the pixel size small but requires a large external memory to store the exposure time for all of the pixels, and further requires memory refreshing and additional column and row decoders. Moreover, multiple reset pulses might need to be applied to each pixel throughout the reset period. The time control for resetting pulses could be quite complicated.

There is therefore a great need for a wide dynamic range image sensor that overcomes some of the above shortcomings and, in particular, outputs image data having a wide dynamic range. Further, the sensor should not require external timestamp memory and control logic to update the exposure times.

SUMMARY OF THE INVENTION

The invention provides an improved technique for updating data memory in digital pixel sensors in which a memory update may be directed to only some of the memory cells in a row/column of the memory. According to an embodiment of the invention, a multiplex scheme is employed to identify the locations of the memory cells within a row/column of the memory that are to be updated. Data are first read out of a row/column of memory cells only some of that are to be updated. The data are copied to a first buffer or other short term storage area within the digital pixel sensor. New data to be written from the sensor portion of the digital pixel sensor to the memory are stored in a second buffer. The contents of the threshold memory are then applied to a select input of a multiplexer, where the contents of the first and second buffers comprise first and second data inputs to the multiplexer. Thus, the output of the multiplexer comprises an updated row/column of memory in which only those memory cells that are to be updated have been changed. The output of the multiplexer is preferably written directly back to the memory and a next row of memory may then be updated.

While the discussion herein is directed to an architecture of the type that includes such a threshold memory, it should be appreciated that this aspect of the invention only requires that provision be made for identifying the locations in a row or column of the memory that are to be updated.

Digital pixel sensors are capable of providing multiple data frames per image capturing. One of the objects of the present invention is to provide a memory updating mechanism to accommodate the multiple data frames so as to produce an image of much improved dynamic ranges.

Other objects and advantages together with the foregoing are attained in the exercise of the invention in the following description and resulting in the embodiments illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention. The detailed description is presented largely in terms of procedures, logic blocks, processing, and other symbolic representations that directly or indirectly resemble the operations of data processing devices coupled to networks. These process descriptions and representations are the means used by those experienced or skilled in the art to most effectively convey the substance of their work to others skilled in the art. In the following discussion, in references to the drawings like numerals refer to like parts throughout the several views.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

An architecture for a digital pixel sensor is disclosed in U.S. patent application Ser. No. 09/567,786 (filed 9 May 2000) in which the dynamic range of the sensor is increased by taking multiple samples of a subject (i.e. a scene) within a predefined exposure time. The use of respective but incremental recording of the same subject (for an equal or different period) allows integration of multiple photodetector signals relative to a threshold value and thus expands the dynamic range of the photodetectors without saturating picture elements in a resultant image.

As used herein, a picture element is a pixel representation in an image. A picture element may be represented in a predefined digital precision, such as 1-bit, 8-bit, 12-bit, and etc. Generally a picture element corresponds to a pixel element on a sensor or photosensitive chip. A pixel element includes at least a photodetector (e.g. a photodiode) and supporting circuitry. In digital pixel sensors, the supporting circuitry includes a circuit that operates to convert an analog signal to a digital signal. In one embodiment, the circuit is an analog-to-digital convention circuit, the detailed description of such circuit is provided in U.S. application Ser. No. 09/274,202. In another embodiment, the circuit includes a portion of an analog-to-digital convention circuit. In other words, the circuits of a number of pixel elements complete an analog-to-digital convention circuit that is to be shared by the number of pixel elements. To facilitate the understanding of the present invention, the following description is based on the circuit in a pixel element fully functioning analog-to-digital convention.

Unlike the conventional CCD or CMOS pixel elements, each of the pixel elements used in the present invention outputs a digital signal via the analog-to-digital convention circuit. In particular, the photodetector is integrated with the analog to digital conversion circuit as an integrated pixel element or simply pixel element.

One of the features in the digital pixel sensor disclosed in U.S. application Ser. No. 09/567,786 is the on-chip data memory. With the on-chip data memory, digital data from the pixel elements can be transferred to the data memory at an extremely high speed that can facilitate the multiple samples of a subject within a predefined exposure time. Each of the memory cells in the data memory is collectively corresponding to a picture element although it is understood to those skilled in the art that a picture element is represented by data from more than one memory elements each of which holds a bit of data. The detailed memory description of the digital pixel sensors can be provided in U.S. application Ser. No. 09/638,503, entitled "Circuit and Method for Pixel Rearrangement in a Digital Pixel Sensor Readout". Without obscuring the invention, the memory element and memory cell are interchangeably used herein and the memory element/cell contains data to present a picture element.

An array of threshold memory cells, each corresponding to one of the pixel elements, is also provided. The threshold memory assures that a picture element corresponding to a particular threshold memory cell does not exceed a threshold value and, therefore, does not provide a saturated signal. Alternatively, the threshold memory assures that a signal in a picture element corresponding to a particular threshold memory cell is read out into a data memory cell only when the signal exceeds a value in the particular threshold memory cell. In essence, the threshold memory avoids the readout of unnecessary values to the memory cells.

An array of time memory cells, each corresponding to one of the pixel elements, establishes a different exposure time for each of the pixel elements for each of multiple samples.

In operation, the memory elements only receive a value from a corresponding one of the pixel elements when the content in a corresponding one of the threshold memory cells permits. In this way, multiple samples may be collected for a subject to be recorded to thereby extend the dynamic range of a photodetector.

Integration of the photodetector and the memory that implements this mechanism into the same integrated circuit avoids the latency that would be otherwise experienced if an external memory was used. The memory in such digital pixel sensors typically comprises a wide data bus in which an entire row in the memory is updated at one time. Such approach is both slow because each of the bits in a row must be updated, and consumes excessive amounts of power because of the amount of energy consumed in unnecessarily updating each of the bits in each of the rows of the memory. It is often only necessary to update some of the bits in a row of memory at any given time because the sensor portion of the digital pixel sensor only detects a significant change in light at some of its locations. Thus, in such digital pixel sensors it would be advantageous to update some bits in a row in the data memory but not necessarily all of the bits in the row. It would be advantageous to provide an improved technique for updating the memory in such digital pixel sensors in which a memory update may be directed to only some of the bits in a row of the memory, i.e. those bits which contain new data from the sensor portion of the digital pixel sensor.

Figure 1A:
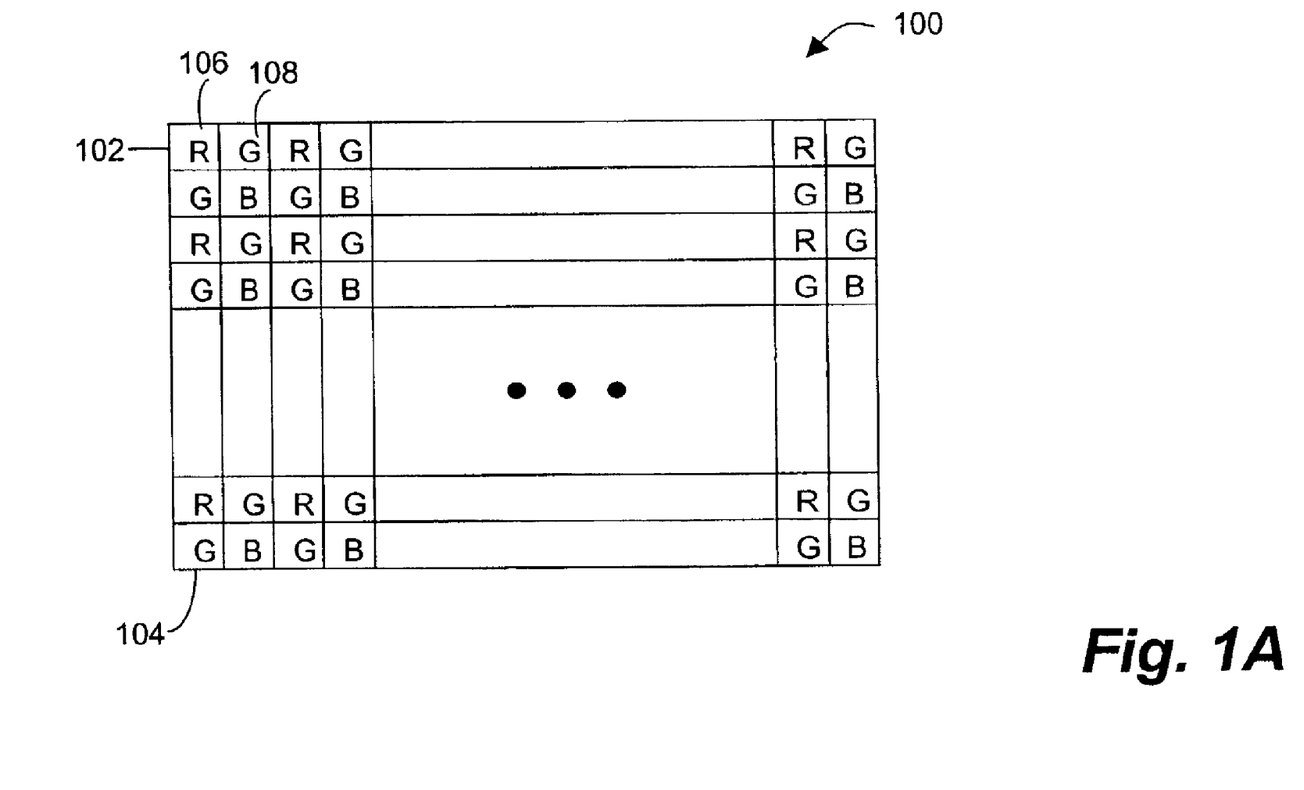
FIG. 1A is a block diagram that shows a CMOS image sensor or photosensitive chip in which the invention may be practiced.

FIG. 1A shows an image sensor or photosensitive chip 100 in which the invention may be practiced. The image sensor 100 may be used in an image capturing device, e.g. a digital camera, for either stationary or video photography, and produces digital image data. The photosensitive chip 100, which is typically fabricated on a substrate such as CMOS, comprises a plurality of photodetectors that are arranged in an array. For color applications, a mosaic of selectively transmissive filters is superimposed in registration with each of the photodetectors so that a first, second, and third selective group of photodetectors are made to sense three different color ranges, for example, the red, green, and blue range of the visible spectrum, respectively. The number of the photodetectors in the photosensitive chip 100 typically determines the resolution of digital images resulting therefrom. The horizontal resolution is a function of the number of photodetectors in a row 102, and the vertical resolution is a function of the number of photodetectors in a column 104.

Each of the photodetectors comprises a photosensor that produces an electronic signal when it is exposed to light. Generally, the photosensor is a photodiode or a photogate in a CMOS sensor.

Figure 1B:
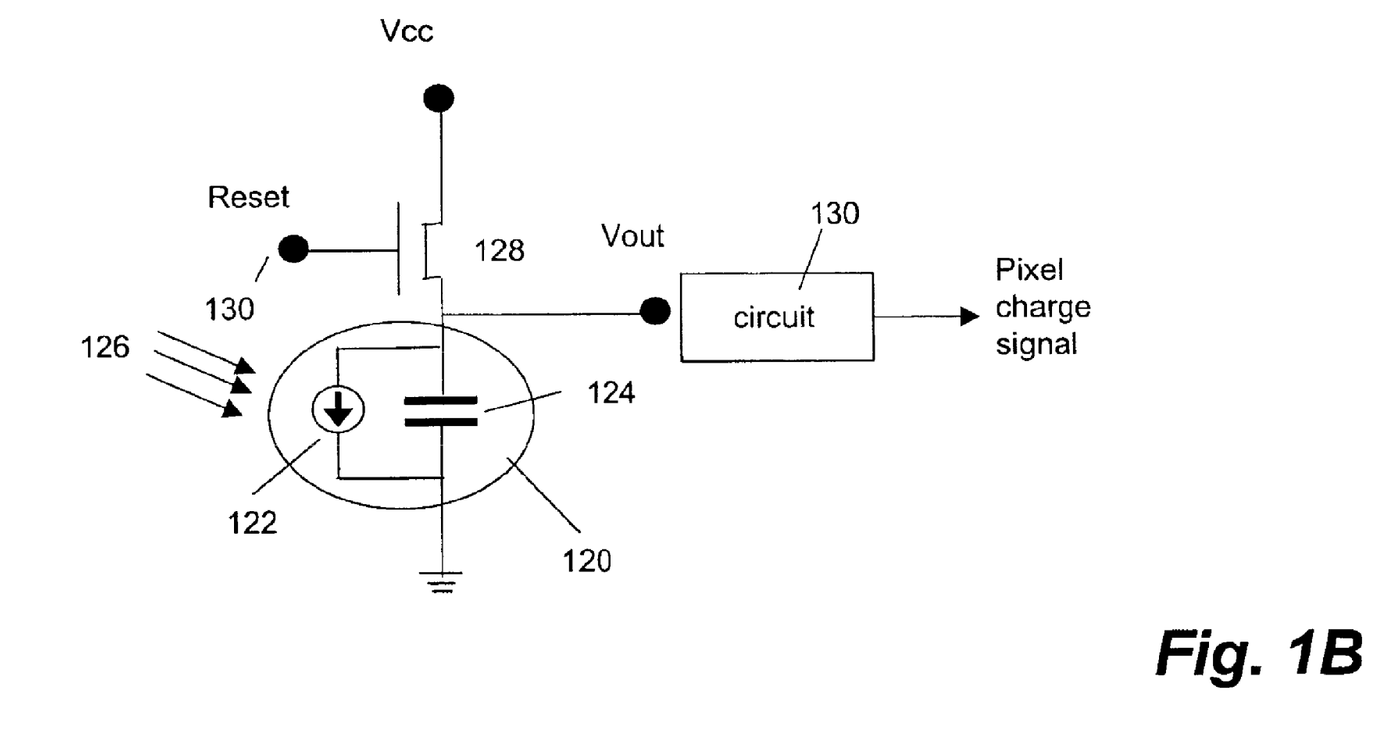
FIG. 1B is a block diagram which shows a photodiode modeled as a current source and a capacitor.

FIG. 1B shows a photodiode 120 that is modeled as a current source 122 and a capacitor 124. When a reset signal is applied at a Reset terminal 130, the capacitor 124 is fully charged by and nearly to Vcc through the transistor 128, at which point the photodiode 120 is ready for light integration.

As soon as the reset signal is dropped, i.e. the voltage level is changed, light integration starts. As more and more incident photons from light 126 strike the surface of the photodiode 120, the current of current source 122 increases. The capacitor 124 starts to discharge through the current source 122. Typically, the photodiode collects more photons for higher photon intensities and, as a result, the resistance of the resistor 122 decreases. Consequently, a faster discharge signal Vout is produced. In other words, the signal from Vout is proportional to the incident photons which strike the photodiode 120. This signal is alternatively referred to herein as an electronic signal or pixel charge signal. Optionally, a circuit 130 may be employed to enhance the electronic signal Vout to a desired level so that the output, i.e. the pixel charge signal, is effectively coupled to following circuitry.

Operation of an image sensor comprises two processes:
The light integration process, as described above; and
The read out process.

Each of these two processes is sustained for a controlled time interval. In the light integration process, each photodetector is initiated to accumulate incident photons of the light and the accumulation is reflected as a pixel charge signal. After the light integration process, the photodetectors start the read out process during which the pixel charge signal in each photodetector is read out via read out circuitry to a data bus or video bus. The interval during which the light integration process proceeds is referred to as exposure control or electronic shuttering, and it controls how much charge is accumulated by each of the photodiodes.

The image sensor is preferably formed on a single integrated circuit chip. The image sensor core comprises a two-dimensional array of light detecting elements, each connected to a dedicated A/D conversion circuit which outputs a stream of bits representative of the analog output of the light detecting element. The combination of a light detecting element and A/D converter constitutes a single pixel element. Each pixel element includes identical circuitry. Digital filters on the chip are connected to receive the digital streams from each pixel element and convert each digital stream to, for example, an eight-bit byte representative of one of 256 levels of light intensity detected by the respective pixel element.

In operation, an image is focused on the image sensor core such that a different portion of the focused image impinges on each pixel element. Each light detecting element comprises a phototransistor whose conductivity is related to the intensity of light impinging upon the base of the phototransistor. The analog current through the phototransistor thus corresponds to the intensity of light impinging upon the phototransistor. The analog signals from all phototransistors in the core are simultaneously converted into serial bit streams output from dedicated A/D conversion circuit clocked using a common clock driver. The serial bit streams, over a period of time, i.e. over a frame period, can then be processed by filters (on-chip or off-chip) to derive a signal representative of the intensity of light impinging on the phototransistor.

After each clock cycle, one bit is latched at an output of each A/D conversion circuit within each pixel element. To now transfer each bit generated by the pixel elements to the filters after each clock cycle, each of the rows of pixel elements are addressed in sequence, using row decoder, until all rows of pixel elements have been addressed. Upon addressing each row, the one-bit output of each pixel element in the addressed row is coupled to a corresponding bit line. The filters process the bit stream from each pixel element to generate an eight-bit value per pixel element corresponding to the average intensity of light impinging on the respective pixel element for that frame period. These eight-bit values may then be output from the chip, using a suitable multiplexer or shift register, and temporarily stored in a bit-mapped memory. The memory may then act as a frame buffer, where the light intensity values in memory are sequentially addressed for controlling the light output of corresponding pixels in a monitor.

In the preferred embodiment of the invention, assume that sixty-four separate filters are used for converting the bit streams output on sixty-four bit lines to eight-bit values. A multiplexer at the output of the core may reduce the number of required filters to, for example, sixteen.

The preferred interaction of the filters with the memory is as follows:

Immediately after a row of pixel elements has been addressed, a control circuit, using the address generated by the row decoder, fetches a previous (or interim) eight-bit value stored in memory for each pixel element in the addressed row and loads this previous value into the proper one of the 64 filters about to receive a new bit from that pixel element.

Conventional memory addressing techniques and circuitry may be used for this process. The single bit output of the respective A/D conversion circuit in the addressed pixel elements is then applied to a respective one of the sixty-four filters containing the previous eight-bit value for that pixel element. Each filter then updates the previous eight-bit value with the new single bit of information to generate a new interim value. The now updated eight-bit value generated by each filter is then transferred back into the memory, under control of the control circuit.

Figure 2:
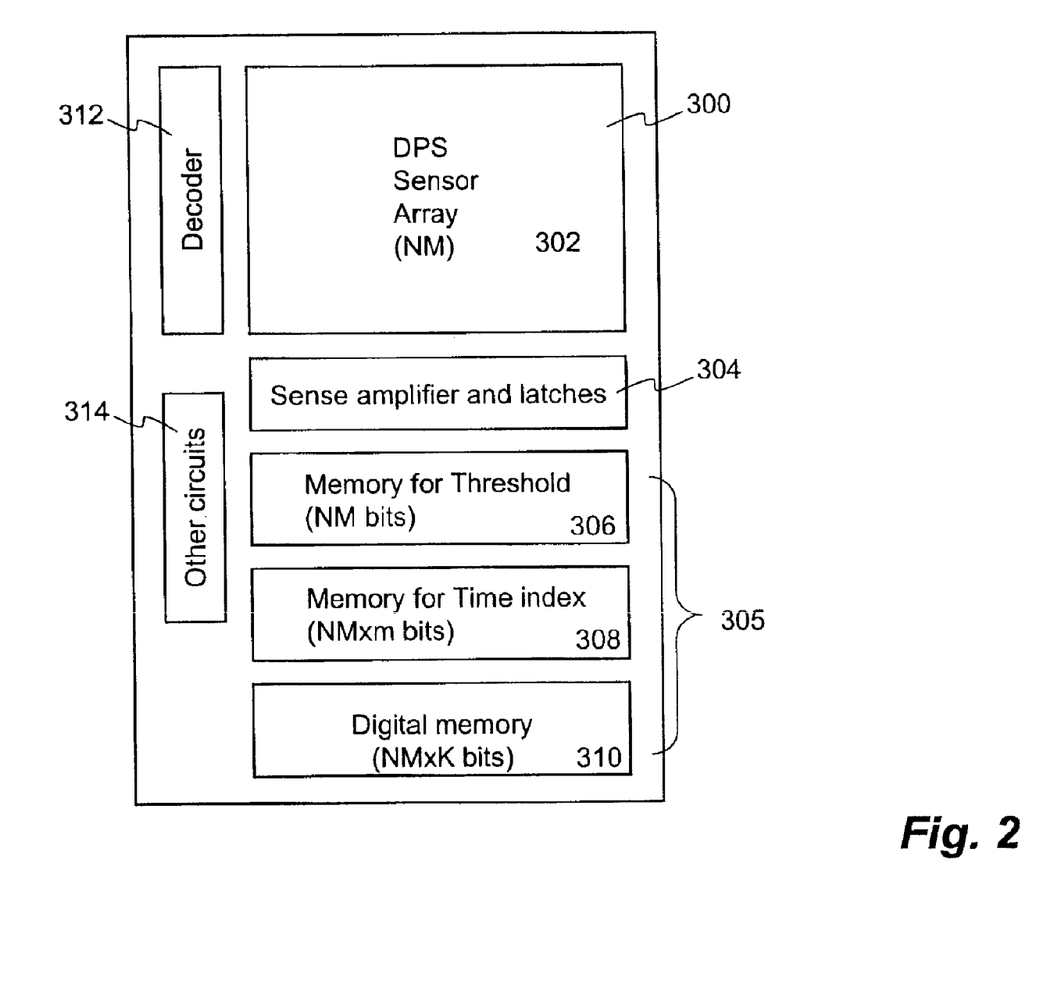
FIG. 2 is a block diagram which shows an image sensor that includes a threshold memory, a time index memory, and a separate data memory, where each of the memories and the digital pixel sensor are integrated into the same sensor according to the invention.

Referring to FIG. 2, there is shown an image sensor 300 based on the digital pixel sensor according to one embodiment of the invention. The digital pixel sensor 302 may be implemented according to U.S. application Ser. Nos. 09/567, 786 and 09/567,638, and outputs digital signals representing one or more images of a scene. A sense amplifier and latches 304 are coupled to the digital pixel sensor 302 to facilitate read out of the digital signals from the digital pixel sensor 302. Unlike the prior art, an image sensor 300 in accordance with the invention also includes memory 305 that is used as threshold memory 306 for storing threshold values, time index memory 308 for storing time index values, and digital or data memory 310 that is large enough to accommodate a frame of image data from sensor 302.

According to one embodiment of the invention, it is assumed that the sensor 302 is of N by M pixels and desired to produce K-bits. Thus, the size of the threshold memory 306 is of N by M bits, the size of the time index memory 308 is of N by M by m bits, where m is the time resolution, and the data memory 310 is of N by M by K bits. For example, a pixel resolution of sensor 302 is 1000 by 1000 for generating 10 bits image signals. Thus, the threshold memory 306 is a one-megabit memory, the time index memory 308 is a two-megabit memory when the time index is set to be T, 2T, 4T and 8T, i.e. two-bit resolution, and the digital memory 306 preferably has a size of at least 1.2 megabytes. Optionally, some reduction techniques may be applied to reduce the memory capacity to hold the same image data and associated threshold and time index data. The exact memory capacity does not affect the operation of the present invention.

As a result of the above memory configuration, each of values in the data memory 310 can be time-stamped by corresponding one of the memory cells in the threshold memory 306 and the time index memory 308.

The preferred embodiment of the invention places an on-chip memory in the image sensor, shown as the data memory 310 in FIG. 2. Thus, there is no bottleneck for data transmission from the sensors 302 to the memory 310. In operation, after one exposure time, a frame of data can be immediately read out to the memory 310.

After the first frame of data is read out into the memory 310, the second frame of data is selectively read out into the memory 310 to improve, update, or enhance the pixel values contained therein. Selection is controlled by the contents of the corresponding threshold memory 306.

Figure 3A:
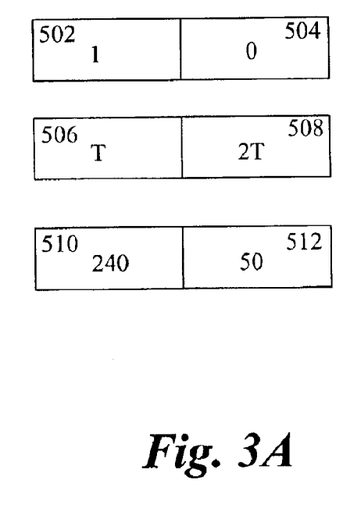
FIG. 3A is a block diagram which shows a pair of exemplary threshold memory cells, exemplary time index memory cells, and exemplary corresponding data memory cells according to the invention.
Figure 3B:
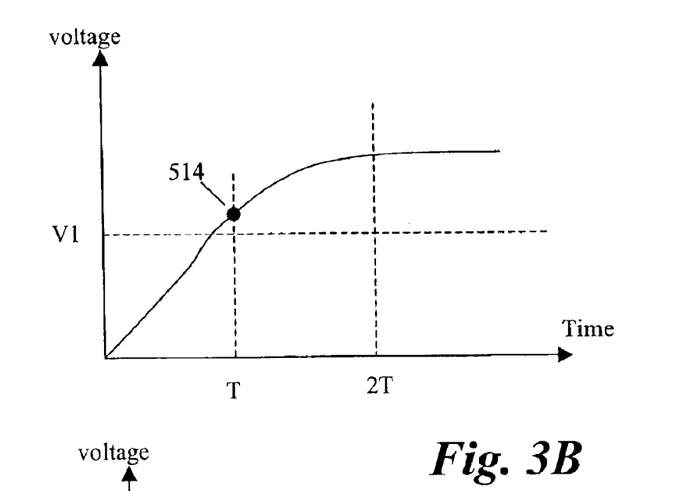
FIG. 3B is a graph showing a first exposure time T in which a resultant signal exceeds a predefined threshold V1.

FIG. 3A shows a pair of exemplary threshold memory cells 502 and 504, exemplary time index memory cells 506 and 508, and exemplary corresponding data memory cells 510 and 512. After a first exposure time T, as shown in FIG. 3B, it is shown that the resultant signal 514 exceeds a predefined threshold V1. Thus, a flag, such as a binary value "1" which represents that the threshold value V1 has been exceeded, is stored in the cell 502, the exposure time T is stored in the cell 506, and the resultant signal or a representation thereof, e.g. the value 240 in eight-bit precision, is stored in the cell 510. The value of threshold V1 is usually so determined that further exposure to the photosensor that produces resultant signal 514 can cause the photosensor to become saturated. Therefore, in view of the flag in the cell 502, there is no need to enhance the value stored in the cell 510 after the first exposure time T. In reality, further update of the cell 510 could cause the loss of the data therein as it is now clear that the next value would be a saturated value.

Figure 3C:
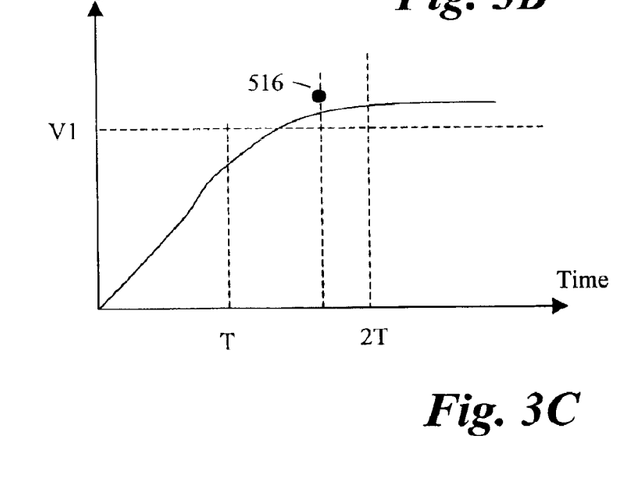
FIG. 3C is a graph showing that a resultant signal produced by an adjacent photodetector is below the threshold V1.

It is now assumed that a resultant signal 516 produced by an adjacent photodetector is below the threshold V1, as shown in FIG. 3C. Therefore, the cell 504 does not store the flag "1," assuming that the cell 504 was reset to "0" when the operation starts. This permits the corresponding data cell 512 to be updated or enhanced with new value that results from a next exposure. It should be noted that the exact contents to be stored in the cells 502, 504, 506, or 508 depend largely on an implementation preference.

Figure 4:
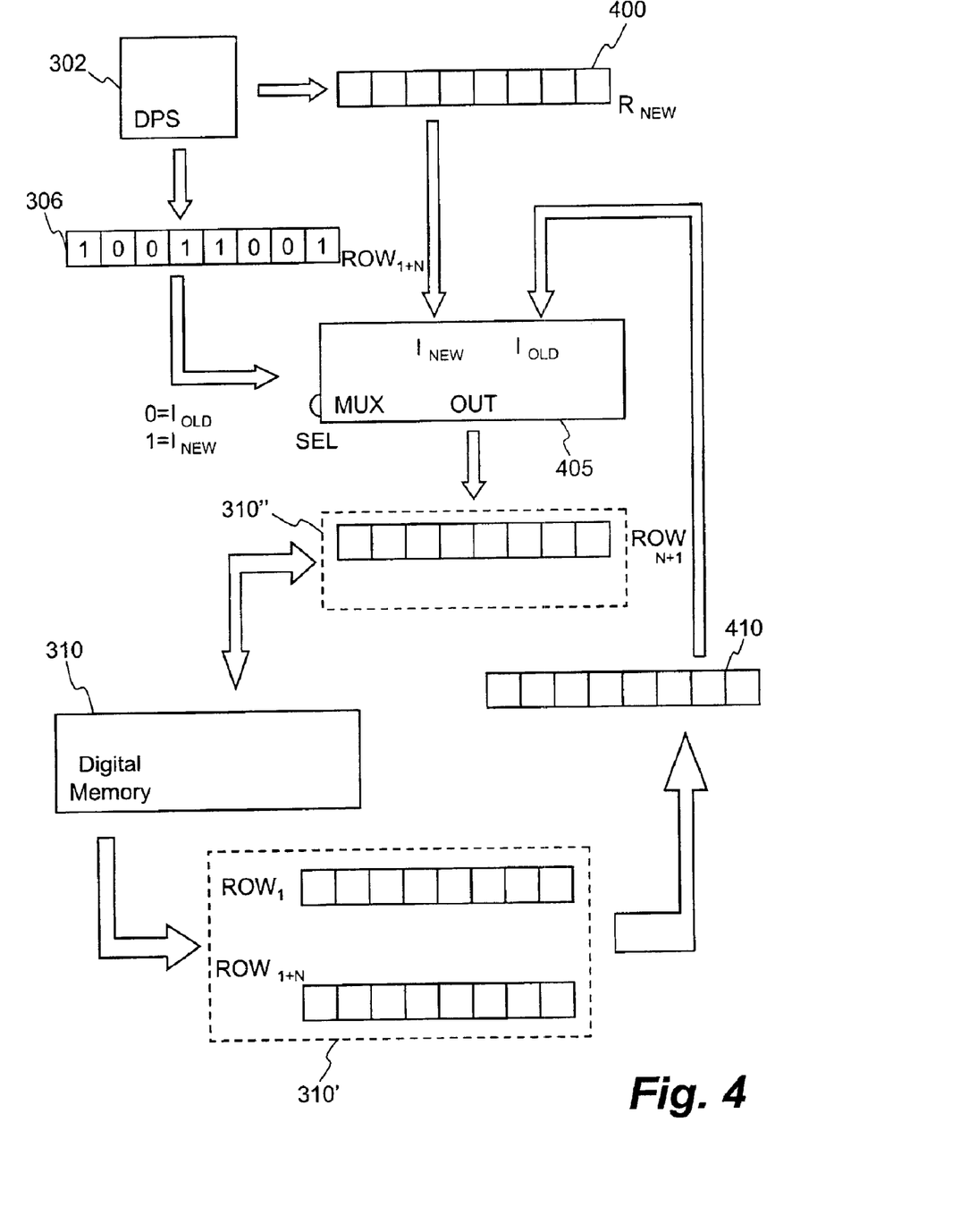
FIG. 4 is a block diagram that shows a memory update mechanism according to the invention.

FIG. 4 is a block diagram that shows a memory update mechanism according to the invention. The invention provides an improved technique for updating the memory in digital pixel sensors in which a memory update may be directed to only some of the locations in a row of the memory, e.g. digital memory 310 of FIG. 2. The preferred embodiment of the invention uses a multiplex scheme in which the threshold memory 306 operates as discussed above to identify the locations within a row of memory that are to be updated, i.e. those locations having a value that exceeds a predetermined threshold. While the discussion herein is directed to an architecture of the type that includes such a threshold memory, it should be appreciated that this aspect of the invention only requires that provision be made for identifying the locations in a row of the memory that are to be updated.

Data are read out of a row (row$_{1+n}$) of memory (represented in dashed lines by numeric designator 310') to be updated. The data are copied to a first buffer 410 or other short term storage area within the digital pixel sensor. New data to be written from the sensor portion 302 of the digital pixel sensor to the memory are stored in a second buffer 400. The contents of the threshold memory are then applied to a select input of a multiplexer 405, where the contents of the first and second buffers comprise first ($I_{OLD}$) and second ($I_{NEW}$) data inputs to the multiplexer. A "1" from the threshold memory selects new data from the second buffer, while a "0" from the threshold memory selects old data from the first buffer. Thus, the output of the multiplexer comprises an updated row (row$_{n+1}$) of memory(represented in dashed lines by numeric designator 310") in which only the values in those locations in the row that are to be updated have been changed. The output of the multiplexer is preferably written directly back to the memory and a next row of memory may then be updated.

Equation (1) below shows the multiplex operation:

$$\text{OUT} = \text{sel} \cdot I_{NEW} + \overline{\text{sel}} \cdot I_{OLD} \quad (1)$$

Although the invention is described herein with reference to the preferred embodiment, one skilled in the art will readily appreciate that other applications may be substituted for those set forth herein without departing from the spirit and scope of the present invention. For example, the memory update approach may be implemented in other types of CMOS image sensors.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

What is claimed is:

1. An image sensor comprising:
   a sensor array that outputs data signals representing one or more images of a scene, wherein the sensor array is fabricated in an integrated circuit;
   a memory space in communication with the sensor array and fabricated in the integrated circuit, the memory space being partitioned into a data memory and a threshold memory, the data memory comprising memory cells for storing values representing the data signals; the threshold memory, in communication with the sensor array, for storing threshold values corresponding to each of the memory cells; and
   an updating mechanism for updating the data memory for each of the one or more images; the update mechanism causing a group of the memory cells to be updated even though only a fractional number of the memory cells in the group need to be updated with new data signals,
   wherein the updating mechanism comprises an identifying mechanism for identifying locations of the fractional number of the memory cells to be updated and a read out mechanism for reading data out of the group of memory cells to a first buffer, wherein the first buffer is part of the memory space; and
   wherein the read out mechanism comprises,
   a multiplexer having a select input, first and second data inputs, and a data output; the first data input coupled to the first buffer and the second date input coupled to a second buffer receiving the new data signals, contents of the threshold memory applied to the select input;
   wherein the threshold memory controls the multiplexer to select which one of the first and second data inputs to pass to the data output; and
   wherein the data output is coupled to the data memory and to update the group of memory cells therein.

2. The image sensor of claim 1, wherein the identifying mechanism includes one of (i) a row counter and (iii) a column counter.

3. The image sensor of claim 1, wherein the group of memory cells is either a row of memory cells or a column of memory cells in the data memory.

4. The image sensor of claim 1,
   wherein the identifying mechanism includes the threshold memory space that includes a number of cells, each corresponding to one of the memory cells in the data memory space; and
   wherein the fractional number of the memory cells are updated with the new data signals when threshold values in some of the corresponding cells in the threshold memory space permit such updating.

5. The image sensor of claim 1, wherein the multiplexer performs a multiplex operation expressed by the equation:

$$\text{OUT} = \text{sel} \cdot I_{NEW} + \overline{\text{sel}} \cdot I_{OLD}$$

where:
   OUT=the data output of the multiplexer;
   sel=a value output from the threshold memory;
   $I_{NEW}$=a new data value from the second buffer; and
   $I_{OLD}$=a data value from the data memory.

6. The image sensor of claim 1, wherein, if the sensor array is of N by M pixels and has k-bits, the threshold memory is at least of N by M bits.

7. The image sensor of claim 1, wherein the sensor array includes a plurality of pixel elements, each including a photodetector and an analog-to-digital conversation circuit, the photodetector generating an analog signal when the sensor array is exposed to the scene, the analog signal converted within the pixel element by the analog-to-digital conversation circuit to one of the data signals.

8. The image sensor of claim 7, wherein the integrated circuit is fabricated by a CMOS process.

9. A method for updating a data memory in an image sensor, the method comprising operations of:
   providing a sensor array that outputs signals representing one or more images of a scene, wherein the sensor array is fabricated in an integrated circuit;
   providing a data memory, in communication with the sensor array, for storing values representative of the signals;
   providing a threshold memory, in communication with the sensor array, for storing threshold values for each picture element of the one or more images of a scene;
   wherein the data memory stores values for each picture element of the one or more images; and
   providing an update mechanism for updating the data memory, wherein a memory update may be directed to only some of the locations in a row of the data memory, wherein providing the update mechanism comprises:
reading data out of a row of the data memory;
proving a first buffer or other short term storage area within the image sensor for storing the data read out of the row of the data memory;
providing a second buffer or other short term storage area within the image sensor for storing new data to be written from the sensor array to the data memory;
providing a multiplexer having a select input, first and second data inputs, and a data output;
applying contents of the threshold memory to the select input; applied contents of the first and second buffers each to a different one of the first and the second data inputs of the multiplexer;
controlling with the threshold memory the multiplexer to select the new data from the second buffer if the predetermined threshold is exceeded;
controlling with the threshold memory the multiplexer to select the data read out of a row of the data memory data from the second buffer if the predetermined threshold is not exceeded; and
providing a data output of the multiplexer which comprises an updated row of memory in which only values in those locations in the row that are to be updated have been changed.

10. The method of claim 9, wherein the mechanism for updating step further comprises:
identifying locations within a row of the data memory that are to be updated.

11. The method of claim 10, wherein the identifying mechanism comprises the threshold memory, wherein those locations within a row of the data memory having a value that exceeds a predetermined threshold are to be updated.

12. The method of claim 9, further comprising:
writing the data output of the multiplexer directly back to the data memory; wherein a next row of memory may then be updated.

13. The method of claim 9, wherein the multiplexer operates a multiplex operation expressed by the equation:

$$OUT = sel \cdot I_{NEW} + \overline{sel} \cdot I_{OLD}$$

where:
OUT=the data output of the multiplexer;
sel=a value output from the threshold memory;
$I_{NEW}$=a new data value from the second buffer; and
$I_{OLD}$=a data value from the data memory.

14. The method of claim 9, wherein the sensor array is of N by M pixels and has k-bits.

15. The method of claim 9, wherein the threshold memory is of N by M bits.

16. The method of claim 9, further comprising:
providing the threshold memory for preventing read out of unnecessary values to the data memory.

17. In an image sensor comprising a sensor array that outputs signals representing one or more images of a scene, wherein the sensor array is fabricated in an integrated circuit; a data memory, in communication with the sensor array, for storing values representative of the signals, and a threshold memory, in communication with the sensor array, for storing threshold values for each picture element of the one or more images of a scene, an apparatus comprising:
a multiplexer having a select input, first and second data inputs, and a data output;
wherein contents of the threshold memory are applied to the select input;
wherein contents of a first and a second buffer are each applied to a different one of the first and the second data inputs of the multiplexer;
wherein the threshold memory controls the multiplexer to select the new data from the second buffer if the predetermined threshold permits;
wherein the threshold memory controls the multiplexer to select the data read out of a row of the data memory data from the second buffer if the predetermined threshold does not permit; and the data output of the multiplexer comprises an updated row of memory in which only values in those locations in the row that are to be updated have been changed.

18. The image sensor of claim 17, wherein the apparatus comprises:
an identifying mechanism for identifying locations within a row of the data memory that are to be updated.

19. The image sensor of claim 18, wherein the identifying mechanism comprises the threshold memory, wherein those locations within a row of the data memory having a value that exceeds a predetermined threshold are to be updated.

20. The image sensor of claim 18, wherein the apparatus comprises: a read out mechanism for reading data out of a row of the data memory.

21. The image sensor of claim 20, wherein the data output of the multiplexer is written directly back to the data memory and a next row of memory may then be updated.

22. The image sensor of claim 20, wherein the multiplex operation is expressed by the equation:

$$OUT = sel \cdot I_{NEW} + \overline{sel} \cdot I_{OLD}$$

where:
OUT=the data output of the multiplexer;
sel=a value output from the threshold memory;
$I_{NEW}$=a new data value from the second buffer; and
$I_{OLD}$=a data value from the data memory.

23. The image sensor of claim 17, wherein the image sensor is implemented as a CMOS image sensor.

* * * * *